(12) United States Patent
Boon et al.

(10) Patent No.: US 9,082,246 B2
(45) Date of Patent: Jul. 14, 2015

(54) MEDIA ITEM TRANSPORTATION

(71) Applicant: NCR CORPORATION, Duluth, GA (US)

(72) Inventors: Anthony Boon, Kitchener (CA); Matthew Sonnenberg, Kitchener (CA); Frank Dunn, Waterloo (CA); Fredrik L. N. Kallin, Waterloo (CA)

(73) Assignee: NCR Corporation, Duluth, GA (US)

( * ) Notice: Subject to any disclaimer, the term of this patent is extended or adjusted under 35 U.S.C. 154(b) by 69 days.

(21) Appl. No.: 13/955,472

(22) Filed: Jul. 31, 2013

(65) Prior Publication Data

US 2015/0034452 A1 Feb. 5, 2015

(51) Int. Cl.
| | |
|---|---|
| *G07D 11/00* | (2006.01) |
| *B65G 15/26* | (2006.01) |
| *B65G 17/28* | (2006.01) |
| *G07F 19/00* | (2006.01) |
| *B65H 29/12* | (2006.01) |
| *B65H 31/30* | (2006.01) |

(52) U.S. Cl.
CPC ............ *G07D 11/0021* (2013.01); *B65G 15/26* (2013.01); *B65G 17/28* (2013.01); *B65H 29/12* (2013.01); *B65H 31/3027* (2013.01); *G07D 11/0018* (2013.01); *G07D 11/0033* (2013.01); *G07F 19/202* (2013.01); *B65H 2403/942* (2013.01); *B65H 2404/254* (2013.01); *B65H 2404/2613* (2013.01); *B65H 2404/2615* (2013.01); *B65H 2404/63* (2013.01); *B65H 2404/691* (2013.01); *B65H 2701/182* (2013.01); *B65H 2701/1912* (2013.01)

(58) Field of Classification Search
CPC ....... G07D 11/033; B65G 15/26; B65G 17/28
USPC ........... 194/343, 344, 346; 209/534; 271/225, 271/279, 302; 198/369.2, 588, 592; 186/49, 186/68, 69; 193/35 TE
See application file for complete search history.

(56) References Cited

U.S. PATENT DOCUMENTS

| | | | | |
|---|---|---|---|---|
| 5,326,093 | A | * | 7/1994 | Sollitt ........................... 271/306 |
| 7,422,118 | B2 | * | 9/2008 | Ugo et al. ..................... 209/534 |

* cited by examiner

Primary Examiner — Mark Beauchaine
(74) Attorney, Agent, or Firm — Paul W. Martin (57) ABSTRACT

The present invention provides a method and apparatus for transporting items of media along a transport path. The apparatus comprises a first transport member having a first end region and a further transport member having a further end region, wherein the first end region is spaced apart from the further end region, and a bridge member extending between the first end region and the further end region, wherein a length of the bridge member is adjustable responsive to a one of the first and further end regions being moved with respect to a remainder one of the first and further end regions.

15 Claims, 9 Drawing Sheets

MEDIA ITEM TRANSPORTATION

FIELD OF THE INVENTION

The present invention relates to a method and apparatus for transporting items of media along a transport path. In particular, but not exclusively, the present invention relates to transporting items of media, such as currency notes, across a gap between spaced apart transport members of a media item processing module.

BACKGROUND OF THE INVENTION

Various situations are known in which items of media are transported along different transport pathways in a Self-Service Terminal (SST). In a typical check depositing Automated Teller Machine (ATM), an ATM customer is allowed to deposit a check (without having to place the check in a deposit envelope) in a publicly accessible, unattended environment. To deposit a check, the ATM customer inserts an identification card through a card slot at the ATM, enters the amount of the check being deposited, and inserts the checks to be deposited through a check slot of a check acceptor. A check transport mechanism receives the inserted check and transports the check in a forward direction along an 'infeed' check transport path to a number of locations within the ATM to process the check.

If the check is not accepted for deposit, the check transport mechanism transports the check in a reverse direction along a 'return' check transport path to return the check to the ATM customer via the check slot.

If the check is accepted for deposit, an amount associated with the check is deposited into the ATM customer's account and the check itself is transported to a storage bin within the ATM. An endorser printer prints an endorsement onto the check as the check is being transported to and stored in the storage bin. Checks in the storage bin within the ATM are periodically picked up and physically transported via courier to a back office facility of a financial institution for further processing.

It is known for a check transport mechanism to include a first transport member and a second transport member for transporting one or more checks along the infeed or return transport paths. It is known for the infeed transport path to be differently orientated with respect to the return transport path so the second transport member is moveable relative to the first transport member to move between infeed and return positions to thereby direct one or more checks along the infeed or return transport paths as desired.

A gap between respective end regions of the first and second transport members changes as the second transport member moves with respect to the first transport member between infeed and return positions. One or more problems therefore exist relating to how to transport media items from the first transport member to the second transport member, or vice versa, over this gap which may have a variable length and orientation. Such problems also relate to how media items are transported along the infeed or return transport path to prevent an error occurring during a customer transaction at the ATM which might lead to checks being damaged during said transaction.

SUMMARY OF THE INVENTION

It is an aim of the present invention to at least partly mitigate the above-mentioned problems.

It is an aim of certain embodiments of the present invention to provide a method and apparatus for transporting an item of media along at least one transport path to and from a customer of an SST.

It is an aim of certain embodiments of the present invention to provide a method and apparatus for transporting an item of media across a space between first and further transport members of a media item processing module.

It is an aim of certain embodiments of the present invention to provide a self-adjusting apparatus for bridging a variable space between first and further transport members of a media item processing module.

According to a first aspect of the present invention there is provided apparatus for transporting an item of media along at least one transport path, comprising:
  a first transport member having a first end region and a further transport member having a further end region, wherein the first end region is spaced apart from the further end region; and
  a bridge member extending between the first end region and the further end region, wherein a length of the bridge member is adjustable responsive to a one of the first and further end regions being moved with respect to a remainder one of the first and further end regions.

Aptly, the bridge member comprises a first bridge portion and a further bridge portion, and the first bridge portion is automatically moveable towards or away from the further bridge portion responsive to an adjustment of the length of the bridge member.

Aptly, the further bridge portion comprises at least one track that supports and guides the first bridge portion as the first bridge portion automatically moves with respect to the further bridge portion.

Aptly, the at least one track of the further bridge portion comprises at least one elongate channel, and the first bridge portion comprises a guided region, extending from the first bridge portion, that is received by and guided along the elongate channel responsive to the first bridge portion being moved with respect to the further bridge portion.

Aptly, the further bridge portion comprises:
  a central portion disposed on a longitudinal axis of the bridge member, wherein the central portion of the further bridge portion comprises the at least one elongate channel;
  a pair of support members each perpendicularly extending from the central portion with respect to the longitudinal axis; and
  at least one further track perpendicularly extending from each of the pair of support members to support the first bridge portion.

Aptly, the first bridge portion comprises:
  a central portion disposed on the longitudinal axis of the bridge member, wherein the central portion of the first bridge portion comprises the guided region; and
  a pair of support members each perpendicularly extending from the central portion with respect to the longitudinal axis to be supported by the further tracks of the further bridge portion.

Aptly, the first bridge portion comprises a first set of spaced apart elongate ribs and the further bridge portion comprises a further set of spaced apart elongate ribs, wherein the first and further sets of elongate ribs support an item of media being transported across the bridge member, and the first set of ribs is received between respective ribs of the further set of ribs when the first bridge portion is moved with respect to the further bridge portion.

Aptly, the first bridge portion is pivotally attached to the first end region of the first transport member and the further bridge portion is pivotally attached to the further end region of the further transport member to allow for rotational movement of the first and/or further transport members with respect to the bridge member.

Aptly, the first and/or further bridge portion is releasably attached to the first and/or further transport member respectively.

Aptly, the first and/or further bridge portion comprises a plurality of hook members that releasably attach the bridge member to a roller shaft of the first and/or further transport member.

Aptly, the apparatus further comprises a drive member that transports an item of media across the bridge member along a transport path between the first end region and the further end region.

Aptly, the drive member comprises at least one drive belt supported on a plurality of rollers, wherein the drive belt is elastic to accommodate an adjustment of the length of the bridge member.

Aptly, the plurality of rollers comprise at least one roller associated with the first bridge portion and at least one further roller associated with the further bridge portion.

Aptly, the apparatus further comprises:
a first transport unit comprising the first transport member and a first opposed transport member facing the first transport member for locating an item of media between the first transport member and the first opposed transport member; and
a further transport unit comprising the further transport member and a further opposed transport member facing the further transport member for locating an item of media between the further transport member and the further opposed transport member, wherein an item of media is transportable along the transport path between the first transport unit and the further transport unit.

Aptly, the first opposed transport member is pivotally attached to the further opposed transport member.

Aptly, the first transport member is moveable with respect to the first opposed transport member between an open configuration and a closed configuration of the first transport unit responsive to an item of media being located between the first transport member and the first opposed transport member, and the further transport member is moveable with respect to the further opposed transport member between an open configuration and a closed configuration of the further transport unit responsive to an item of media being located between the further transport member and the further opposed transport member.

According to a second aspect of the present invention there is provided a media item processing module comprising apparatus according to the first aspect of the present invention.

According to a third aspect of the present invention there is provided a Self-Service Terminal (SST) comprising a media item processing module according to the second aspect of the present invention.

According to a fourth aspect of the present invention there is provided a method of transporting an item of media along at least one transport path, comprising:
via a bridge member, connecting a first end region of a first transport member to a further end region of a further transport member;
moving at least one of the first and further end regions with respect to a remainder one of the first and further end regions; and
adjusting a length of the bridge member responsive to said movement of the first and/or further end regions.

Aptly, the adjusting step comprises:
automatically moving a first bridge portion of the bridge member towards or away from a further bridge portion of the bridge member responsive to an adjustment of the length of the bridge member.

Aptly, the method further comprises:
via a drive member, transporting an item of media across the bridge member between the first end region of the first transport member and the further end region of the further transport member.

Aptly, the method further comprises:
maintaining a substantially constant tension in the drive member during the step of adjusting the length of the bridge member, wherein the drive member comprises an elastic drive belt.

According to a fifth aspect of the present invention there is provided a method of transporting an item of media along at least one transport path, comprising:
via an adjustable bridge member, connecting a first transport member to a further transport member to provide a continuous transport path for an item of media to be transported along, wherein at least one of the first and further transport members is moveable with respect to a remainder one of the first and further transport members.

According to a sixth aspect of the present invention there is provided apparatus for transporting an item of media along at least one transport path, comprising:
a first transport member spaced apart from, and moveable with respect to, a further transport member; and
an adjustable bridge member for bridging a space between the first and further transport members.

According to a seventh aspect of the present invention there is provided an infeed for a media handler, the infeed comprising:
a customer transport for receiving a bunch of media items from, and presenting a bunch of media items to, a customer;
a dual path transport moveable between a first position at which media items can be routed from the customer transport to a media item validator, and a second position at which media items can be routed from a return path to the customer transport;
a pivotable bridge extendable between a retracted position and an extended position for bridging a space between the customer transport and the dual path transport at each of the first and second positions.

Certain embodiments of the present invention provide a method and apparatus for transporting an item of media along at least one transport path to and from a customer of an SST.

Certain embodiments of the present invention provide a method and apparatus for transporting an item of media across a space between first and further transport members of a media item processing module.

Certain embodiments of the present invention provide a self-adjusting apparatus for bridging a variable space between first and further transport members of a media item processing module.

BRIEF DESCRIPTION OF DRAWINGS

Embodiments of the present invention will now be described hereinafter, by way of example only, with reference to the accompanying drawings in which.

DESCRIPTION OF EMBODIMENTS

In the drawings like reference numerals refer to like parts.

Figure 1:
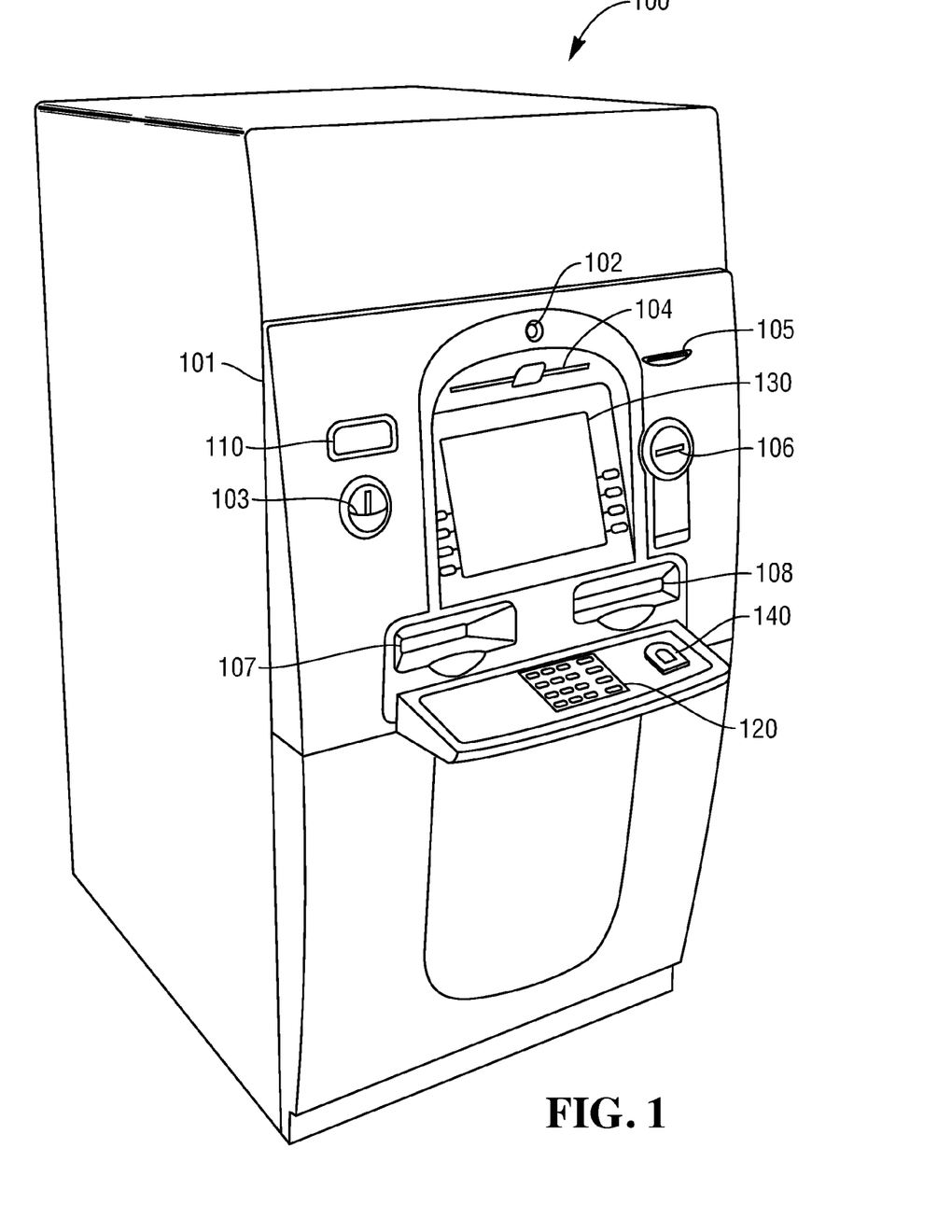
FIG. 1 illustrates an ATM according to an embodiment of the present invention.

FIG. 1 illustrates a self-service check depositing terminal in the form of an image-based check depositing Automated Teller Machine (ATM) 100. It will be appreciated that certain embodiments of the present invention are applicable to a wide variety of terminals in which items of media such as checks and/or currency notes and/or giros and/or lottery tickets and/or other such flexible sheet-like items of media are to be transported and directed in different directions. The type of terminal will of course be appropriate for the type of items of media being transported.

As illustrated in FIG. 1, the ATM 100 includes a fascia 101 coupled to a chassis (not shown). The fascia 101 defines an aperture 102 through which a camera (not shown) images a customer of the ATM 100. The fascia 101 also defines a number of slots for receiving and dispensing media items and a tray 103 into which coins can be dispensed. The slots include a statement output slot 104, a receipt slot 105, a card reader slot 106, a cash slot 107, a further cash slot 108 and a check input/output slot 110. The slots and tray are arranged such that the slots and tray align with corresponding ATM modules mounted within the chassis of the ATM.

The fascia 101 provides a customer interface for allowing an ATM customer to execute a transaction. The fascia 101 includes an encrypting keyboard 120 for allowing an ATM customer to enter transaction details. A display 130 is provided for presenting screens to an ATM customer. A fingerprint reader 140 is provided for reading a fingerprint of an ATM customer to identify the ATM customer.

Within the chassis of the ATM it will be understood that items of media must be transported from time to time from one location to another. The pathway taken by any particular item of media is dependent upon an operation being carried out at the ATM and may also be dependent upon other factors such as whether a customer of the ATM is authorized and/or whether an item of media being transported satisfies certain pre-determined criteria.

Figure 2:
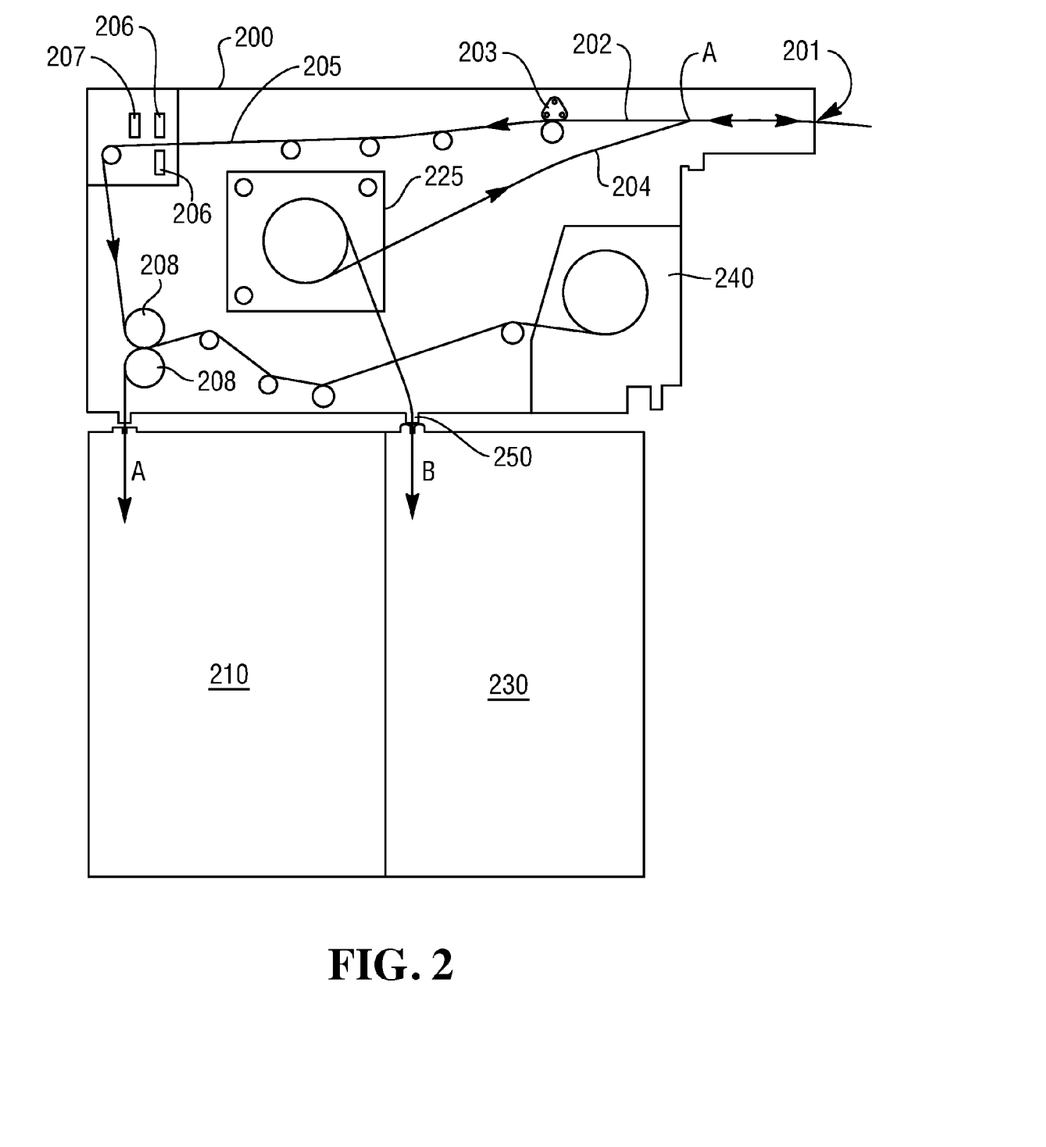
FIG. 2 illustrates transport pathways and modules within the ATM of FIG. 1 according to an embodiment of the present invention.

FIG. 2 illustrates possible transport pathways and internal modules within the ATM which can be utilized to process deposited checks. A check processing module 200 has an access mouth 201 through which incoming checks and/or currency notes are deposited or outgoing checks are dispensed. This mouth 201 is aligned with an infeed aperture in the ATM which thus provides an input/output slot 110. A bunch of one or more media items, such as currency notes or checks, is input or output. Aptly, a bunch of a hundred items or more can be received/dispensed. Incoming checks follow a first transport path 202 away from the mouth 201 in a substantially horizontal direction from right to left shown in FIG. 2. The first transport path 202 is also referred to as the infeed path. The checks then pass through a feeder/separator 203 and along another pathway portion 205 which is also substantially horizontal and right to left. The checks are then de-skewed and read by imaging cameras 206 and an MICR reader 207. Checks are then directed substantially vertically downwards to a point between two nip rollers 208. These nip rollers co-operate and are rotated in opposite directions with respect to each other to either draw deposited checks inwards (and urge those checks towards the right hand side in FIG. 2), or during another mode of operation, the rollers can be rotated in an opposite fashion to direct processed checks downwards in the direction shown by arrow A in FIG. 2 into a check bin 210. Incoming checks which are moved by the nip rollers 208 towards the right can either be diverted upwards (in FIG. 2) into a re-buncher unit 225, or downwards in the direction of arrow B in FIG. 2 into a cash bin 230, or to the right hand side shown in FIG. 2 into an escrow 240. Checks from the escrow can be directed to the re-buncher 225 or downwards into the cash bin 230. Checks can be reprocessed or returned to a customer via a further transport path 204, also known as the return path.

Figure 3:
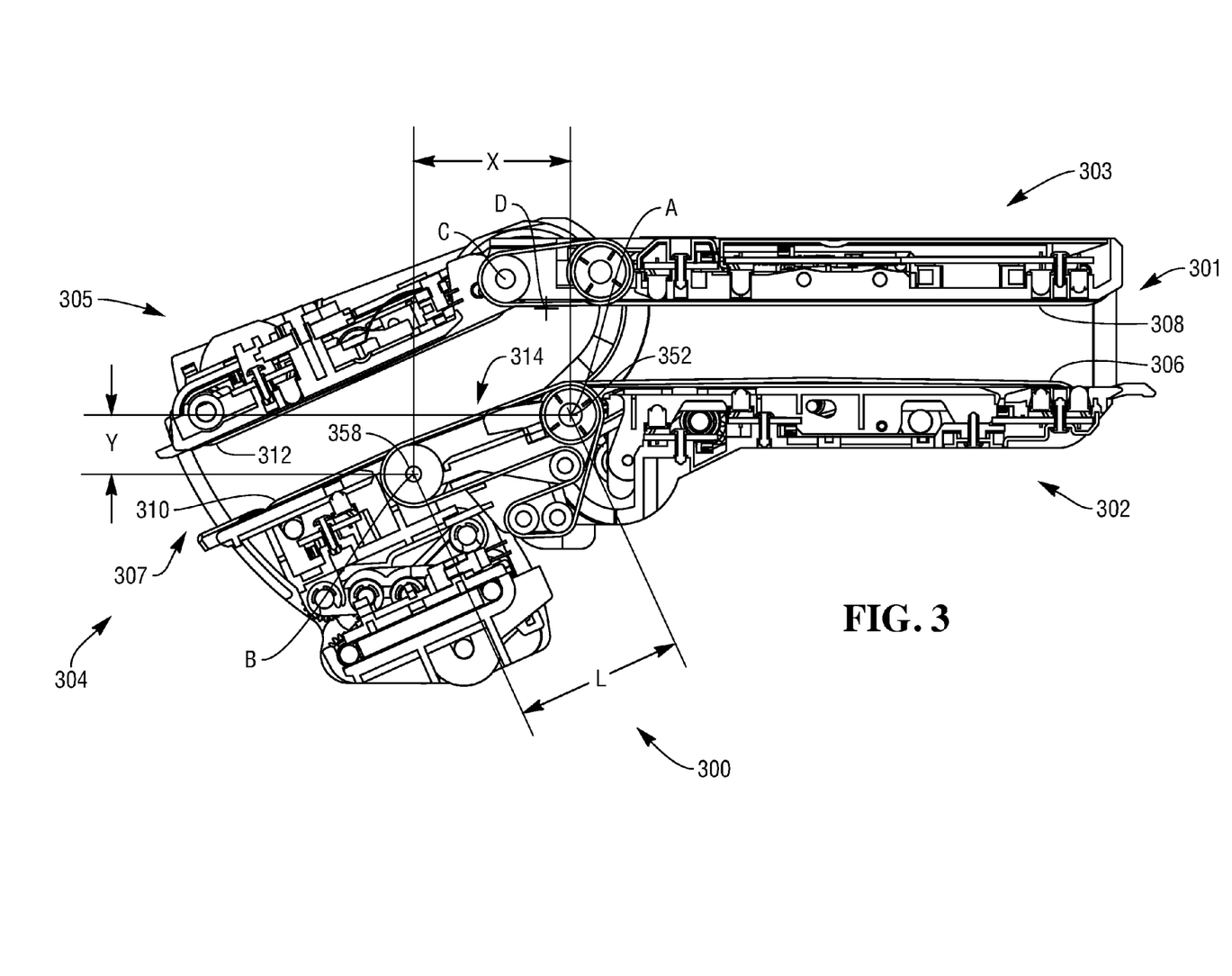
FIG. 3 illustrates a media item transport mechanism according to an embodiment of the present invention.

As illustrated in FIG. 3, a media item transport mechanism 300 includes a first pair of opposed transport members 302, 303 shown on the right-hand side of FIG. 3 and a second pair of opposed transport members 304, 305 shown on the left-hand side of FIG. 3. The pairs of transport members provide a predetermined transport path 202, 204 for one or more media items, such as checks or currency notes, to be urged along by the transport mechanism 300. An infeed end region 301 of the first pair of transport members 302, 303 is located and aligned with the access mouth 201 of the check processing module 200. The second pair of transport members 304, 305 pivots relative to the first pair of transport members 302, 305 generally about axis D to selectively direct media items along the infeed path 202 or return path 204 as desired. An end region 307 of the second pair of transport members 304, 305 is aligned with the feeder/separator 203 when in the infeed position for transporting media items along the infeed path 202.

Each of the transport members 302, 303, 304, 305 includes at least one respective transport belt 306, 308, 310, 312 for urging one or more media items along the transport path 202, 204. Aptly, each transport member may include a respective pair of spaced apart transport belts. Alternatively or additionally, rollers, gears, wheels, plates, or the like, may be used to urge one or more media items along the transport path 202, 204. Each pair of transport members 302, 303 and 304, 305 are selectively moved towards or away from each other between closed and open configurations. This is achieved by moving one transport member towards or away from a fixed respective transport member or by moving both respective transport members towards or away from each other. A distance between a respective pair of belts of a respective transport member when in the open configuration is determined by the thickness of a bunch of media items to be or being transported through the transport mechanism 300 and along the transport path 202, 204. For example, respective belts of a pair of transport members will be closer together when gripping and transporting a single media item and spaced further apart from each other when transporting a bunch of media items.

The lower transport member 304 of the second pair of transport members 304, 305 as shown in FIG. 3 is rotatable about axis A with respect to the lower transport member 302 of the first pair of transport members 302, 303. The upper transport member 305 of the second pair of transport members 304, 305 is rotatable about axis C with respect to the upper transport member 303 of the first pair of transport members 302, 303. Axes A and C are located at respective end regions of the upper and lower transport members 302, 303 of the first pair of transport members 302, 303. Thus, the lower transport member 304 of the second pair of transport members 304, 305 is rotatable with respect to the lower transport member 302 of the first pair of transport members 302, 303 between an infeed position, wherein media items are moved from right to left through the transport mechanism 300 and along the infeed transport path 202 to be processed in the ATM, and a return position, wherein media items are moved from left to right through the transport mechanism 300 and along the return transport path 204 to be reprocessed along the infeed path or returned to a customer.

The first and second pairs of transport members 302, 303 and 304, 305 as shown in FIG. 3 are in a return configuration wherein the second pair of transport members 304, 305 is oriented downwardly with respect to the first pair of transport members 302, 303 to urge media items along the return transport path 204 from left to right and towards the mouth 201 of the media item processing module 200. Both pairs of transport members 302, 303 and 304, 305 are in the open configuration to receive and transport media items along the return transport path 204.

A bridge mechanism 314 is provided between spaced apart end portions of the respective lower transport members 302, 304 of the first and second pairs of transport members 302, 303 and 304, 305. The bridge mechanism 314 is hingedly coupled to the respective lower transport members 302, 304 of the first and second pairs of transport members 302, 303 and 304, 305. This allows the lower transport member 304 of the first pair of transport members 302, 303 to rotate with respect to the lower transport member 302 of the second pair of transport members 304, 305 and also allows each pair of transport members 302, 303 and 304, 305 to selectively and independently move between the open and closed configurations.

As will be understood, the transport mechanism 300 can be placed in any one of a number of configurations depending on the desired transport path 202, 204 along which one or more media items are to be transported and/or the location of said media items in the transport mechanism 300 and/or the thickness of a bunch of media items to be or being transported through the transport mechanism 300. Hence, the horizontal distance X and the vertical distance Y between axes A and B varies depending on the configuration of the transport mechanism 300 and more specifically the orientation of lower transport member 304 with respect to lower transport member 302. In turn, a distance (corresponding to bridge length L) directly between axes A and B also changes. Dimension Y can change by around 35 mm and dimension X can change by around 25 mm depending on the configuration of the transport mechanism. In turn, distance L can change by around 20 mm from a minimum of around 44 mm to a maximum of around 64 mm. To accommodate for the angle of the second pair of transport members 304, 305 with respect to the first pair of transport members 302, 303, the configuration of each pair of transport members and, in turn, the variable spacing between respective end regions of the lower transport members 302, 304 of each pair of transport members, the length L of the bridge mechanism 314 is automatically adjustable.

Figure 4:
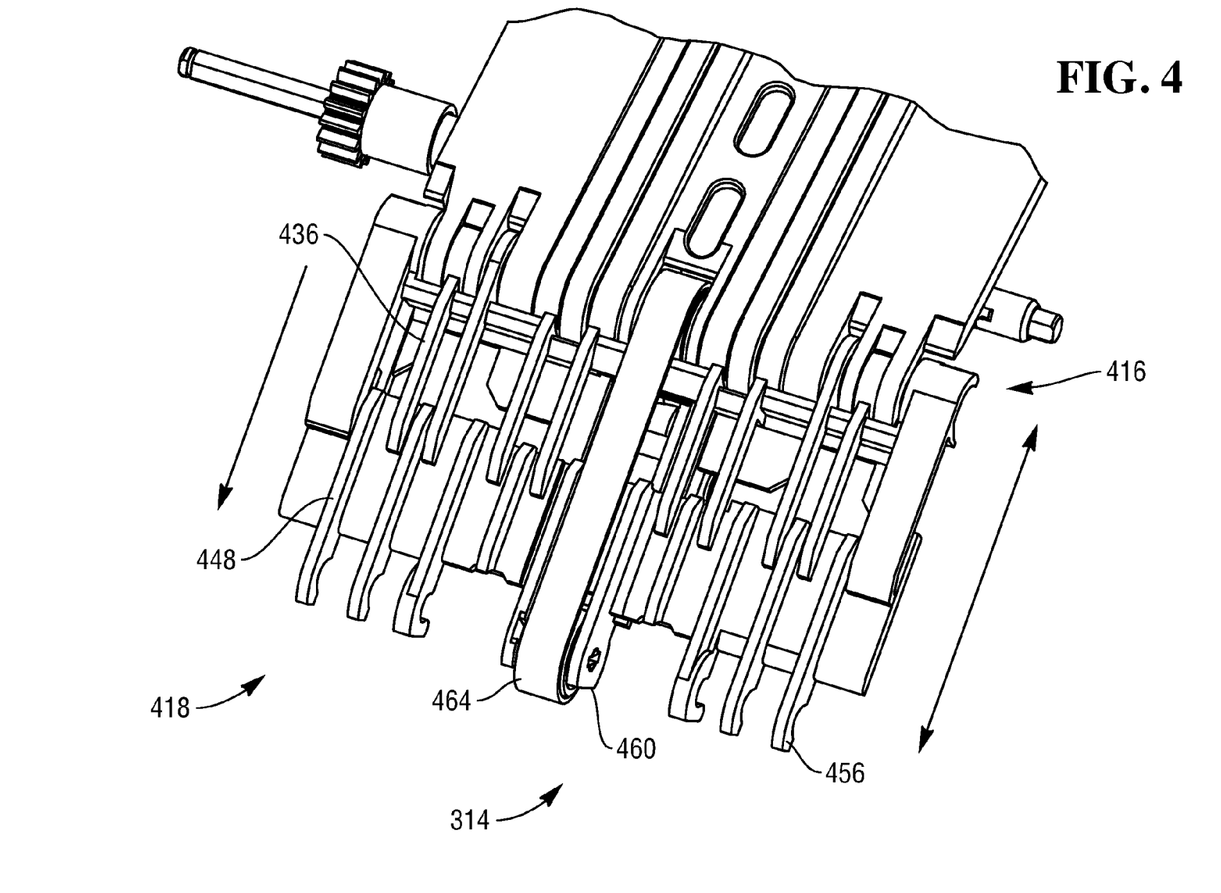
FIG. 4 illustrates an upper view of a bridge mechanism of the media item transport mechanism of FIG. 3, wherein the bridge mechanism is in an extended configuration.
Figure 5:
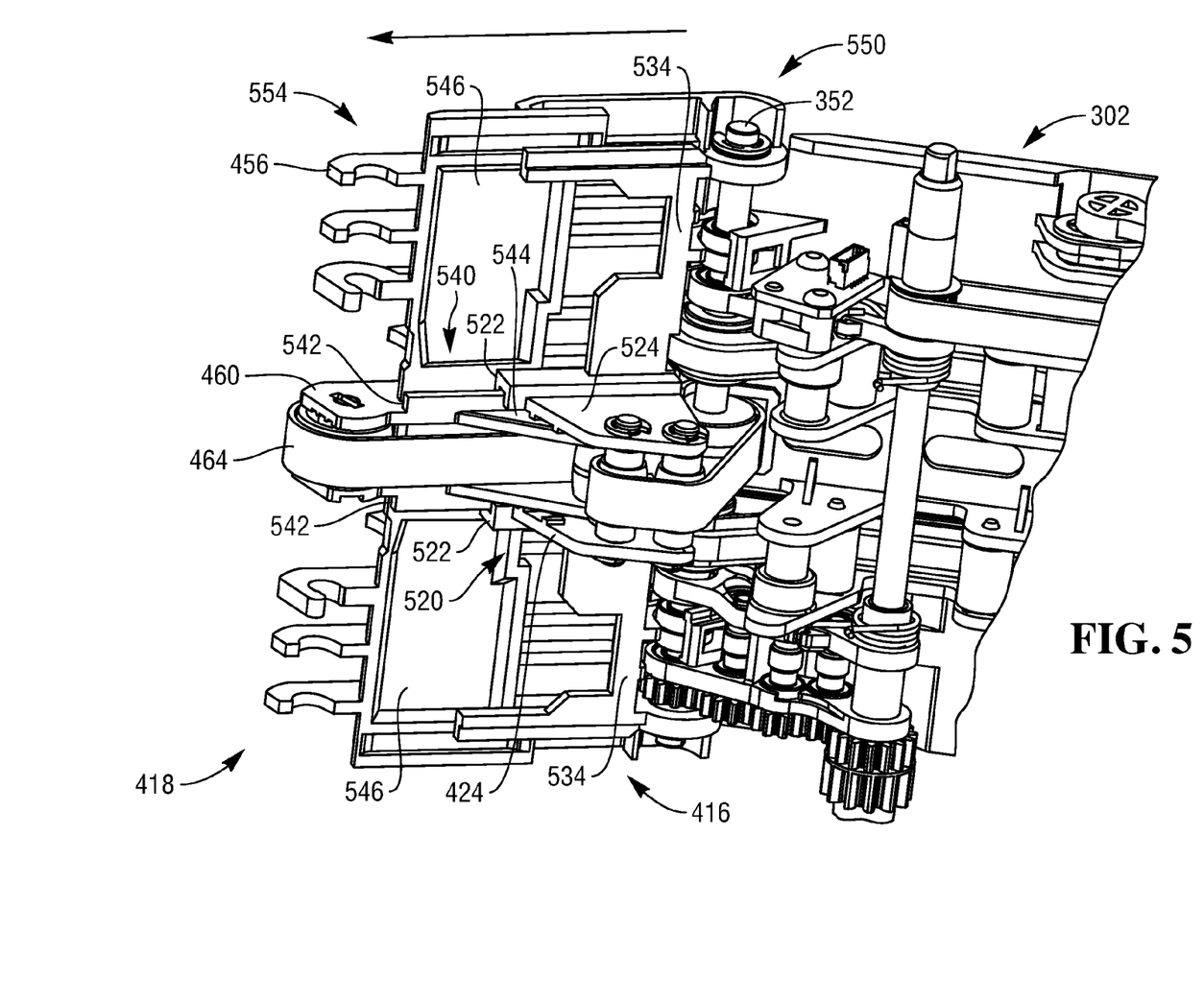
FIG. 5 illustrates a lower view of the bridge mechanism of FIG. 4.
Figure 6:
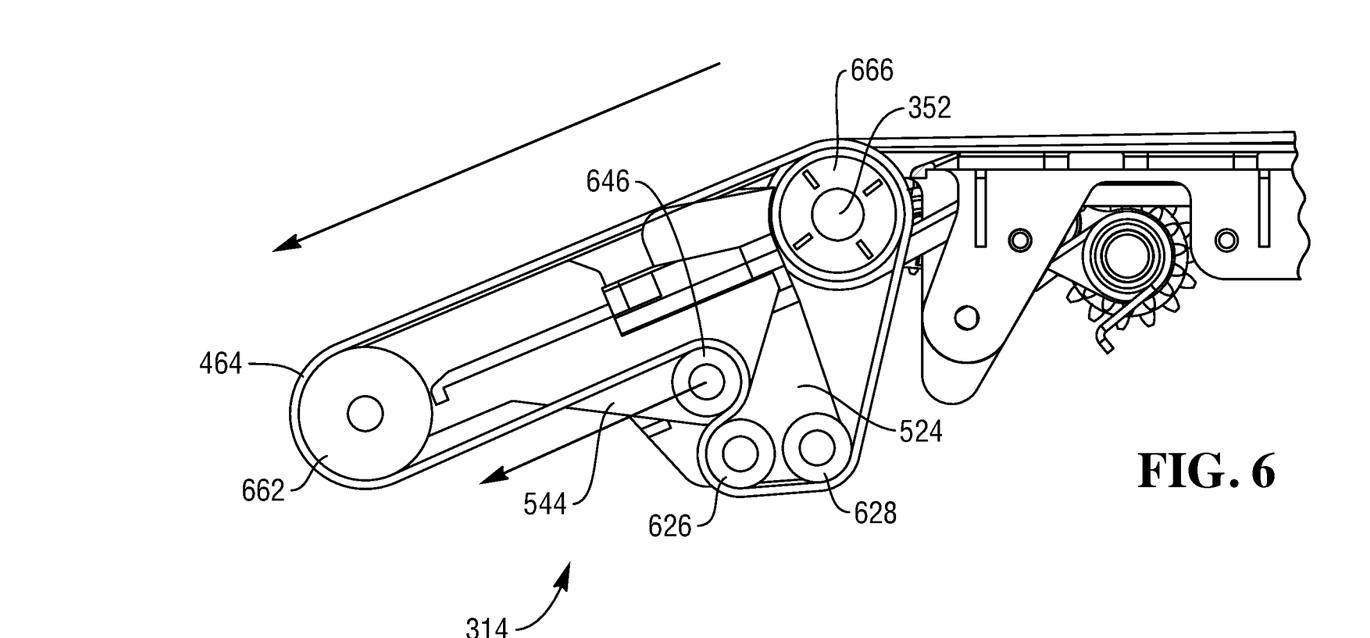
FIG. 6 illustrates a longitudinal cross section through the bridge mechanism of FIGS. 4 and 5.
Figure 7:
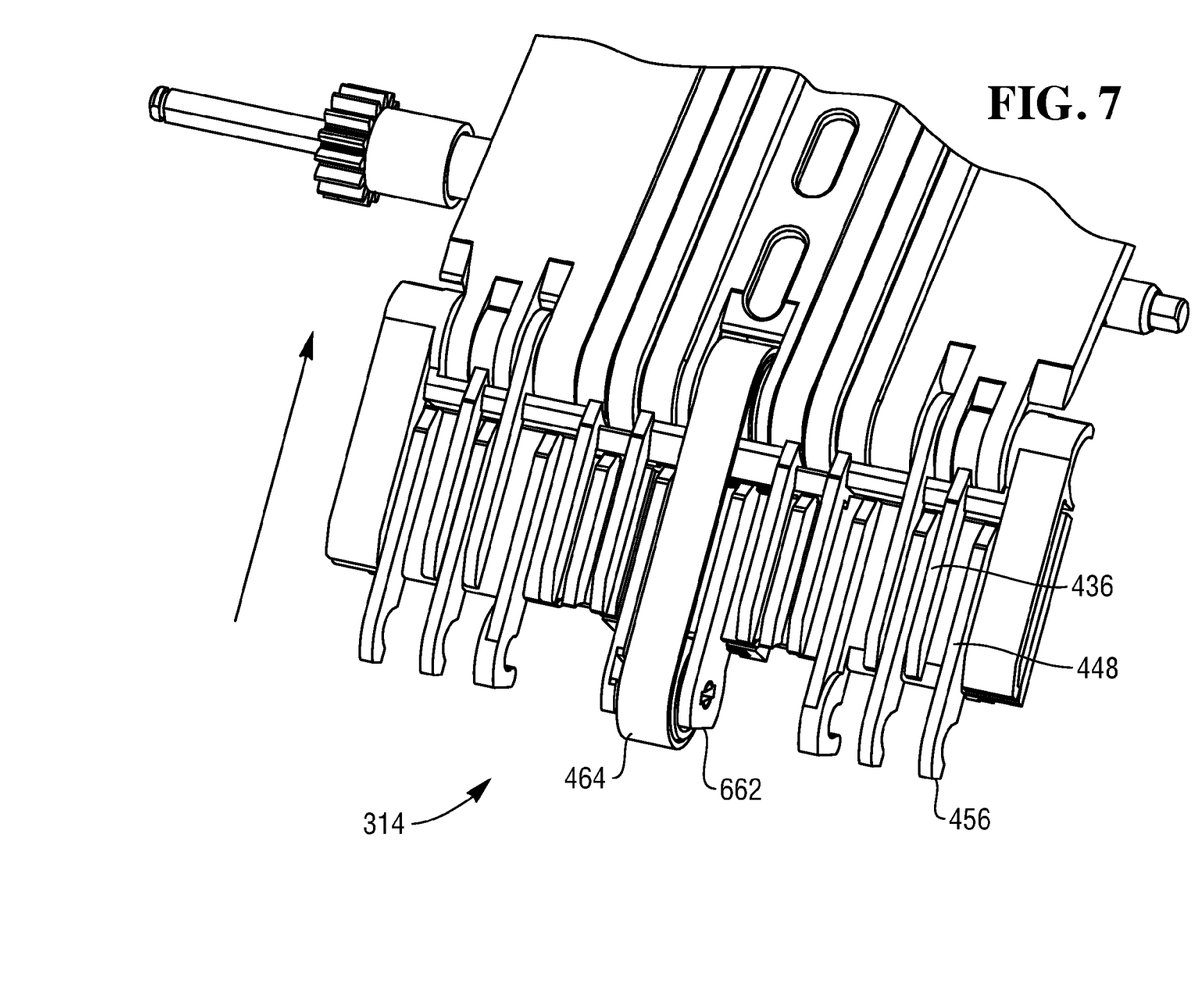
FIG. 7 illustrates an upper view of the bridge mechanism of the media item transport mechanism of FIG. 3, wherein the bridge mechanism is in a retracted configuration.
Figure 8:
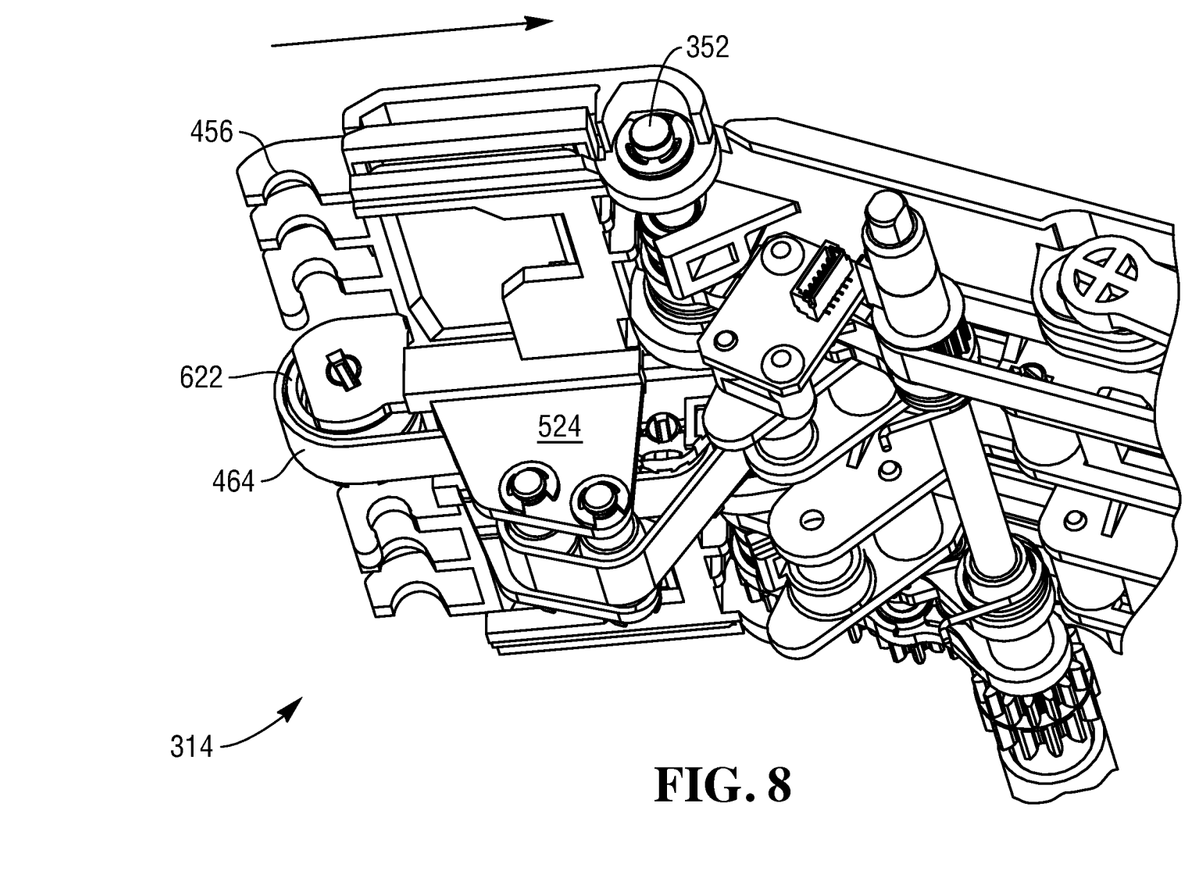
FIG. 8 illustrates a lower view of the bridge mechanism of FIG. 7.
Figure 9:
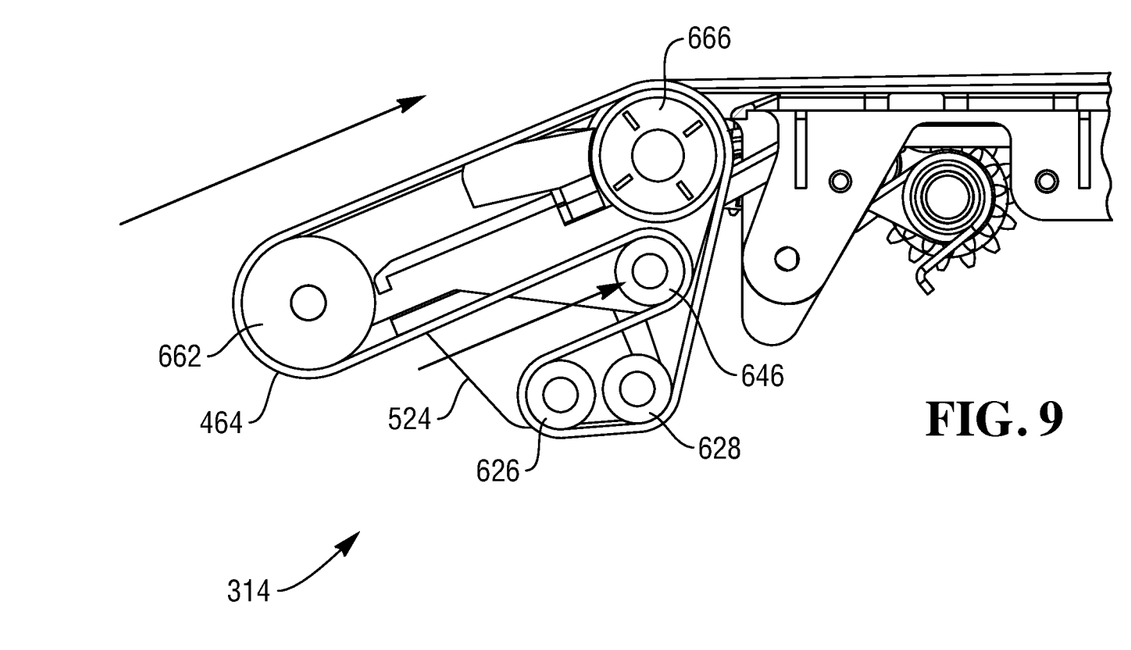
FIG. 9 illustrates a longitudinal cross section through the bridge mechanism of FIGS. 7 and 8.

As shown in FIG. 4, the bridge mechanism 314 includes two main portions; a first bridge portion 416 and a second bridge portion 418. The first and second bridge portions 416, 418 are slideably coupled together so that the overall length of the bridge mechanism 314 can automatically adjust in response to respective end regions of the lower transport members 302, 304 of the respective pairs of transport members, and in turn axes A and B, moving towards or away from each other depending on the desired configuration of the transport mechanism 300. FIGS. 4 to 6 show the bridge mechanism 314 in an extended configuration and FIGS. 7 to 9 show the bridge mechanism 314 in a retracted configuration. The second bridge portion 418 is moveable relative to the first bridge portion 416 to adjust the length of the bridge mechanism 314.

A respective edge portion 550 of the first bridge portion 416 is pivotally attached to a drive roller shaft 352 of the lower transport member 302 of the first pair of transport members 302, 303. A respective edge portion 554 of the second bridge portion 418 includes a plurality of hook formations 456 to pivotally attach to a drive roller shaft 358 (as best shown in FIGS. 3 and 4) of the lower transport member 304 of the second pair of transport members 304, 305.

As best shown in FIGS. 5 and 6, the first bridge portion 416 has a centrally located main body 520 including opposed elongate channel formations 522 longitudinally oriented in the direction of the transport path 202, 204. The second bridge portion 418 includes a centrally located main body 540 including a pair of opposed outwardly extending longitudinal flanges 542 which are correspondingly shaped with the channel formations 522 of the first bridge portion 416. The channel formations 522 of the first bridge portion 416 receive, support and guide the flanges 542 of the second bridge portion 418 so the that second bridge portion 418 is supported and guided by the first bridge portion 416 when moving relative to the first bridge portion 416 between extended and retracted positions.

As best shown in FIG. 6, a pair of spaced apart lugs 524 extend downwardly from the main body 520 of the first bridge portion 416 to support a pair of spaced apart secondary rollers 626, 628. The main body 540 of the second bridge portion 418 includes a pair of spaced apart and longitudinally extending lugs 460 to support a primary roller 662. The main body 540 of the second bridge portion 418 also includes a pair of spaced apart downwardly extending lugs 544 to support a single secondary roller 646. A drive roller 666 is mounted to the drive roller shaft 352 of the lower transport member 302 of the first pair of transport members 302, 303.

A transport belt 464 extends around the drive roller 666 of the lower transport member 302 of the first pair of transport members 302, 303, around the secondary rollers 626, 628 of the first bridge portion 416, and around the primary roller 662 and secondary roller 646 of the second bridge portion 418. The drive roller 666 drives the belt 464 in the feed or return directions responsive to the desired transport path 202, 204 along which a media item is to be transported.

FIGS. 6 and 9 illustrate the bridge mechanism 314 in the extended and retracted configurations respectively. As shown, the secondary roller 646 of the second bridge portion 418 moves with respect to the secondary rollers 626, 628 of the first bridge portion 416 as the second bridge portion 418 moves with respect to the first bridge portion 416. This ensures the length and tension of the belt 464 are kept constant as the bridge mechanism 314 self-adjusts in response the lower transport member 304 of the second pair of transport members 304, 305 moving towards or away from the lower transport member 302 of the first pair of transport members 303, 304. The belt 464 is made from an elastic material, such as rubber, to accommodate for any stretch and to ensure the tension in the belt 464 is constant. A material such as rubber also has a coefficient of friction suitable for gripping a media item and urging the media item along the transport path 202, 204. The belt 464 passes between the lugs 544 of the second bridge portion 418 which help to guide and prevent the belt from slipping from the rollers.

The first bridge portion 416 has a pair of arms 534 which extend outwardly from the main body 520 in a perpendicular direction with respect to the transport path 202, 204. A first set of elongate ribs 436 extend longitudinally from each arm 534 towards the second bridge portion 418 in a substantially parallel direction to the transport path 202, 204. The second bridge portion 418 has a pair of sheet-like arms 546 which extend outwardly from the main body 540 in a perpendicular direction with respect to the transport path 202, 204. A further set of elongate ribs 448 extend upwardly from each of the arms 546. Each of the first and further sets of elongate ribs 436, 448 are spaced apart such that the first set of ribs 436 is staggered with respect to the further set of ribs 448 to allow each of the further set of ribs 448 to slide between respective ribs of the first set of ribs 436 when the second bridge portion 418 moves with respect to the first bridge portion 416. The first and further sets of ribs 436, 448 support and guide at least one media item across the bridge mechanism 314 and along the transport path 202, 204.

The bridge mechanism 314 according to certain embodiments of the present invention therefore supports and guides at least one media item across respective end regions of spaced apart respective transport members and along a predetermined transport path. The bridge mechanism provides a continuous transport path irrespective of one of the transport members moving towards or away from the other of the transport members. The bridge mechanism provides a relatively long continuous transport path to allow a relatively long media item to be returned along the return transport path from left to right to be located in the transport mechanism without a leading end of the media item extending beyond the infeed end region 301 or the exit end region 307. The second pair of transport members are in turn allowed to reorient from the return position to the infeed position before transporting the media item along the infeed transport path from right to left for reprocessing. The bridge mechanism is self-adjusting so that its length can automatically adjust responsive to a one of the transport members moving towards or away from the other of the transport members. Such self-adjustment eliminates the need for re-locating and/or re-orienting one or both of the transport members to close a gap between respective end regions of each transport member. The bridge mechanism includes a driven transport belt to urge a media item across the bridge mechanism and along the transport path. The bridge mechanism ensures the length and tension of the belt is kept constant during said automatic adjustment of the length of the bridge mechanism.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. Apparatus for transporting an item of media along at least one transport path, comprising:
   a first transport member having a first end region;
   a moveable further transport member having a further end region spaced apart from the first end region; and
   a bridge member extending between the first end region of the first transport member and the further end region of the further transport member, wherein a length of the bridge member is adjustable during movement of the further end region with respect to the first end region during movement of the further transport member.

2. The apparatus as claimed in claim 1, wherein the bridge member comprises a first bridge portion and a further bridge portion, and the first bridge portion is automatically moveable towards or away from the further bridge portion responsive to an adjustment of the length of the bridge member.

3. The apparatus as claimed in claim 2, wherein the further bridge portion comprises at least one track that supports and guides the first bridge portion as the first bridge portion automatically moves with respect to the further bridge portion.

4. The apparatus as claimed in claim 3, wherein the at least one track of the further bridge portion comprises at least one elongate channel, and the first bridge portion comprises a guided region, extending from the first bridge portion, that is received by and guided along the elongate channel responsive to the first bridge portion being moved with respect to the further bridge portion.

5. The apparatus as claimed in claim 4, wherein the further bridge portion comprises:
   a central portion disposed on a longitudinal axis of the bridge member, wherein the central portion of the further bridge portion comprises the at least one elongate channel;
   a pair of support members each perpendicularly extending from the central portion with respect to the longitudinal axis; and
   at least one further track perpendicularly extending from each of the pair of support members to support the first bridge portion.

6. The apparatus as claimed in claim 5, wherein the first bridge portion comprises:
   a central portion disposed on the longitudinal axis of the bridge member, wherein the central portion of the first bridge portion comprises the guided region; and a pair of support members each perpendicularly extending from the central portion with respect to the longitudinal axis to be supported by the further tracks of the further bridge portion.

7. The apparatus as claimed in claim 6, wherein the first bridge portion comprises a first set of spaced apart elongate ribs and the further bridge portion comprises a further set of spaced apart elongate ribs, wherein the first and further sets of elongate ribs support an item of media being transported across the bridge member, and the first set of ribs is received between respective ribs of the further set of ribs when the first bridge portion is moved with respect to the further bridge portion.

8. The apparatus as claimed in claim 2, wherein the first bridge portion is pivotally attached to the first end region of the first transport member and the further bridge portion is pivotally attached to the further end region of the further transport member to allow for rotational movement of the first and/or further transport members with respect to the bridge member.

9. The apparatus as claimed in claim 1, further comprising a drive member that transports an item of media across the bridge member along a transport path between the first end region of the first transport member and the further end region of the further transport member.

10. The apparatus as claimed in claim 1, further comprising:
   a first transport unit comprising the first transport member and a first opposed transport member facing the first transport member for locating an item of media between the first transport member and the first opposed transport member; and
   a further transport unit comprising the further transport member and a further opposed transport member facing the further transport member for locating an item of media between the further transport member and the further opposed transport member, wherein an item of media is transportable along the transport path between the first transport unit and the further transport unit.

11. A media item processing module comprising apparatus as claimed in claim 1.

12. A method of transporting an item of media along at least one transport path, comprising:
   via a bridge member, connecting a first end region of a first transport member to a further end region of a moveable further transport member;
   moving the further end region with respect to the first end region during movement of the further transport member; and
   adjusting a length of the bridge member responsive to said movement of the further end region.

13. The method as claimed in claim 12, wherein the adjusting step comprises:
   automatically moving a first bridge portion of the bridge member towards or away from a further bridge portion of the bridge member responsive to an adjustment of the length of the bridge member.

14. The method as claimed in claim 12, further comprising:
   via a drive member, transporting an item of media across the bridge member between the first end region of the first transport member and the further end region of the further transport member.

15. An infeed for a media handler, the infeed comprising:
   a customer transport for receiving a bunch of media items from, and presenting a bunch of media items to, a customer, the customer transport having a first end region;
   a dual path transport moveable between a first position at which media items can be routed from the customer transport to a media item validator, and a second position, lower than the first position, at which media items can be routed from a return path to the customer transport, the dual path transport having a further end region spaced apart from the first end region, and the dual path transport being elevated to the first position from the second position; and
   a pivotable bridge extendable between a retracted position and an extended position for bridging a space between the first end region of the customer transport and the further end region of the dual path transport at each of the first and second positions.

* * * * *